Dec. 4, 1928.
H. L. MERRICK
RECORDING MEANS
Filed Jan. 10, 1925
1,693,701
3 Sheets-Sheet 1
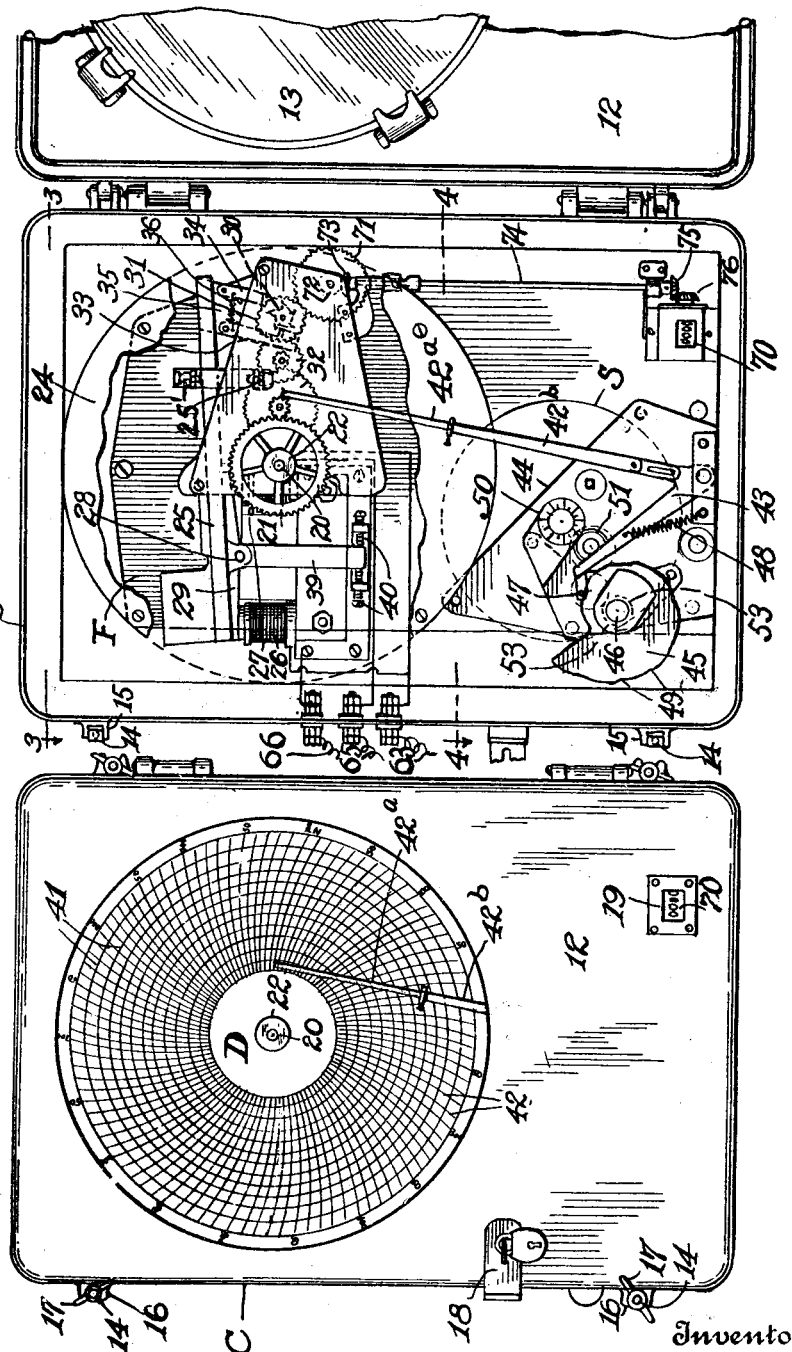
Inventor
H. L. Merrick
By his Attorney

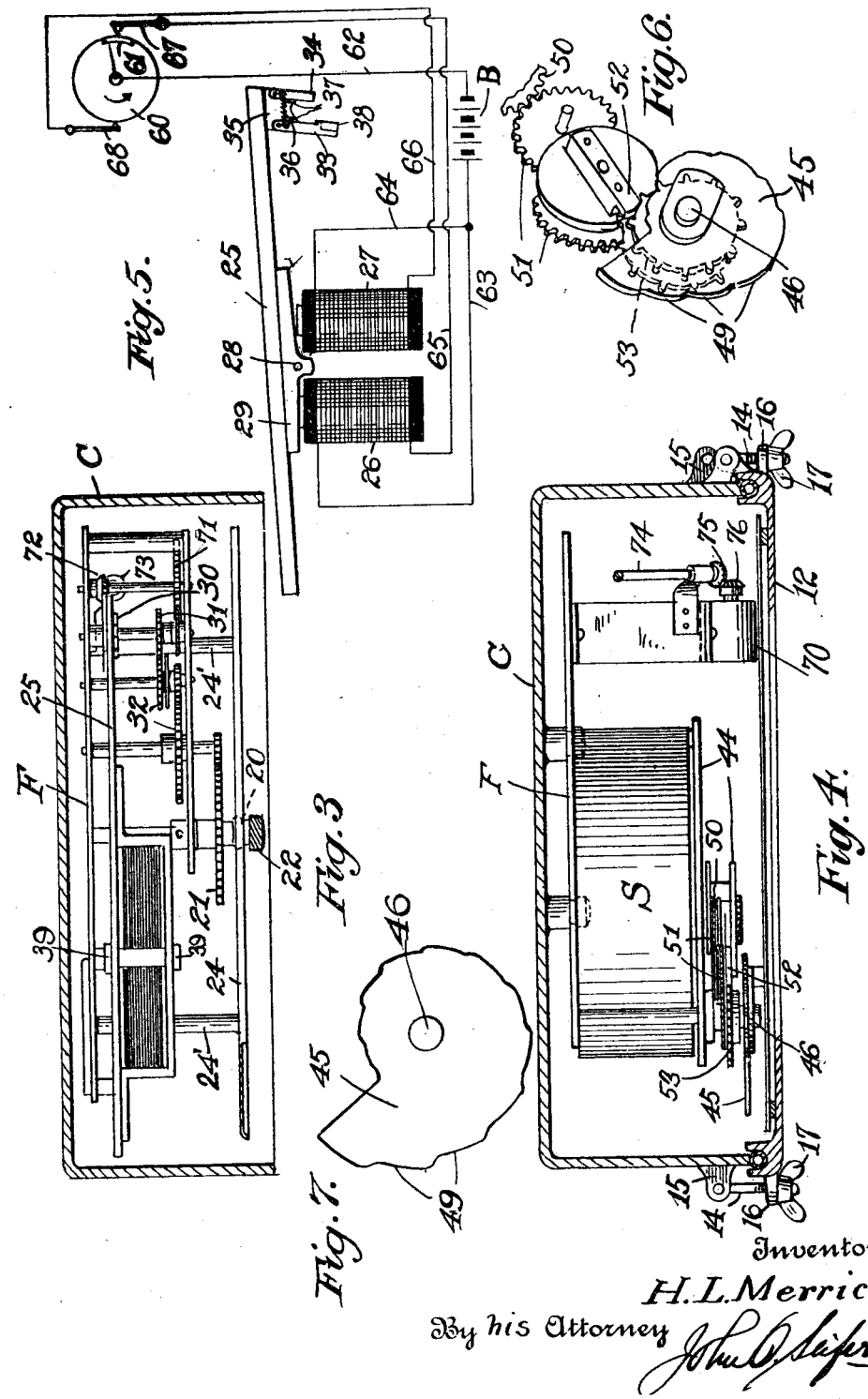

Dec. 4, 1928.
H. L. MERRICK
1,693,701
RECORDING MEANS
Filed Jan. 10, 1925   3 Sheets-Sheet 3
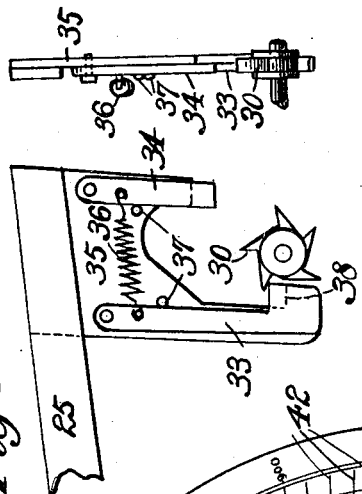
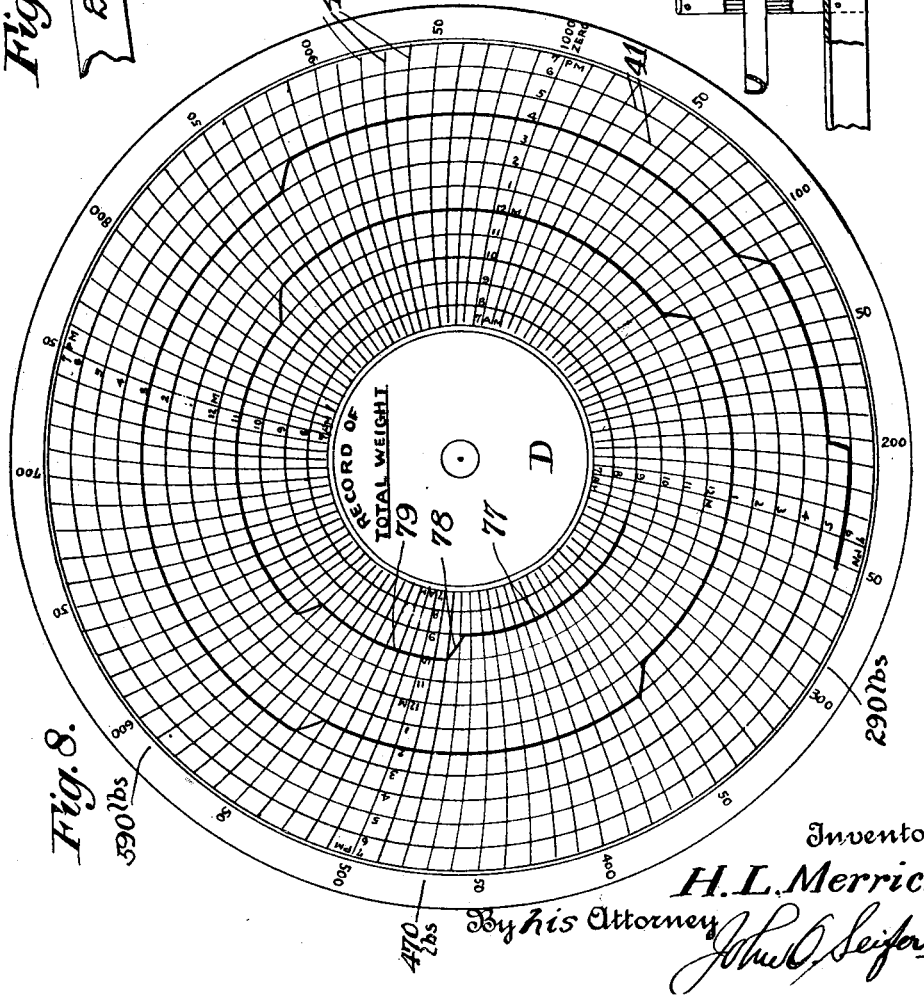
Inventor
H. L. Merrick.
By his Attorney Patented Dec. 4, 1928.

1,693,701

UNITED STATES PATENT OFFICE

HERBERT L. MERRICK, OF PASSAIC, NEW JERSEY.

RECORDING MEANS.

Application filed January 10, 1925. Serial No. 1,594.

This invention relates to graphic recording means or a chart recorder, and it is the object of the invention to provide an improved recorder of this character which while adapted for various uses is particularly adapted for use to graphically record or indicate the quantity of material handled by material handling means, such as a material handling way or traveling conveyer, in successive periods of time of the same duration, to indicate fluctuations or variations in the quantities of material handled in such successive periods of time, as well as the total quantity of material handled during such successive periods of time, and to provide means for this purpose which is simple in structure and highly efficient in use.

It is a further object of the invention to provide in connection with graphic recording means of this character a counter to indicate the total quantity of material handled during the successive periods of time, as well as during a series of such successive periods of time.

A further object of the invention relates to an improved graduated dial for use in connection with graphic recording means.

While the invention is adapted to various uses an embodiment thereof will be described in connection with automatic weighing mechanism to record and indicate the quantity of material or weight of a load handled during successive periods of time of the same duration, said weighing mechanism including a material handling way which may be a traveling conveyer belt, and an integrating device operative by the rate of linear conveyer belt travel and the load on and in course of transportation by the conveyer.

The various features of the invention are illustrated in the drawings accompanying and forming a part of the present application in which Figure 1 is a front elevation of a casing in which the actuating means of the recording mechanism is mounted and arranged for visual observation of a dial on which the record is graphically indicated.

Figure 2 is a front elevation of the casing shown in Figure 1 with the closure therefor in open position, the dial being removed and portions partly broken away to indicate the mechanism mounted in the casing.

Figure 3 is a cross sectional view taken substantially on the line 3—3 of Figure 2 looking in the direction of the arrow.

Figure 4 is a cross sectional view taken substantially on the line 4—4 of Figure 2 looking in the direction of the arrow.

Figure 5 is a side elevation of electromagnetic means for rotating a dial upon which the graphic record is made and showing in connection therewith in a diagrammatic manner the electric circuit means for controlling the energizing of said electromagnetic means.

Figure 6 is a detail view in cross section to show the driving connection for a cam with time controlled means to move the scriber laterally of the dial.

Figure 7 is a detail view of a cam for moving a scribing tool laterally at predetermined intervals.

Figure 8 is a face or plan view of the improved dial upon which the graphic record is made.

Figure 9 is a detail view in side elevation on an enlarged scale of pawl and ratchet mechanism to operate the actuating means for the dial.

Figure 10 is an end elevation of the pawl and ratchet mechanism shown in Figure 9; and Figure 11 is a detail view of material handling means including a traveling belt conveyer and weighing mechanism with integrating means combined therewith to determine the quantity or weight of material transported by the conveyer.

Similar characters of reference designate like parts throughout the different views of the drawings.

My improved recording mechanism is mounted in a casing C having an open side with a releasable closure 12 hinged thereto having an opening with a transparent closure 13, such as glass, and when the closure 12 is in close position to serve as a window through which to observe a dial D within the casing and upon which dial a graphic record is made. The closure 12 is securely drawn to the casing by bolts 14 pivotally carried by lugs extending laterally from the casing, as at 15, and adapted to engage in slotted lugs 16 extending laterally from the closure with thumbnuts 17 threaded onto said bolts at the outer side of the closure lugs. The closure may be secured in closed position by a hasp and lock, as shown at 18. The closure is also arranged with a second window, as at 19, through which to observe a recorder or counter mounted within the casing.

The dial D is mounted upon a rotatable support in the form of an arbor 20 by passing said arbor through a perforation centrally of the dial and clamping the dial between the hub of a gear 21 fixed on said arbor and a knurled nut 22 (Figure 3) threaded onto the outer end of the arbor, said arbor being rotatably mounted in a frame (designated in a general way at F) mounted on the back of the casing.

To prevent the dial from folding and crumpling, a plate 24, preferably of metal, is rigidly mounted on one end of posts 24' fixed at the opposite ends in the frame F. The plate 24 has a hole centrally thereof large enough to permit of the free passage of the arbor 20 and nut 22. The peripheral portion of said backing plate is flanged forward and arranged with four or six crimped clips circumferentially disposed about the flange to loosely retain, yet permit rotation of the peripheral portion of the dial. The dial is rotated step by step or intermittently by electromagnetically operated means, comprising a pivotally supported rocker 25 adapted to be oscillated or reciprocated by a pair of magnets of the solenoid type 26, 27 arranged at opposite sides of the pivotal support 28 of the rocker, the rocker having associated therewith a bar 29 of magnetizable material to serve as an armature common to both of the magnets. As one magnet, for instance the magnet 26, is energized it will operate to attract the bar 29 to the core thereof and move the rocker in one direction, and when the other magnet 27 is energized it will attract the bar 29 thereto and move the rocker in reverse direction. The dial is rotated by pawl and ratchet mechanism through the movements of the rocker and comprises a ratchet wheel 30 (Figures 2, 3, 9 and 10) rotatably mounted in the frame F and operatively connected to the gear 21 of the dial arbor by a gear 31 rotatable with the ratchet wheel and an interposed train of gearing 32. This ratchet wheel has an uneven number of teeth, preferably five in number. The ratchet wheel is rotated by a pair of pawls 33, 34 pivotally mounted at one end upon a carrier 35 to be suspended therefrom and positioned to have substantially longitudinal movement at opposite sides of the ratchet wheel, as clearly shown in Figures 2 and 9. The pawl carrier 35 may be attached to or form an integral part of the rocker. The pawl 34 is of less length than the pawl 33 and they are normally urged by a spring 36, connected at opposite ends to the pawls, in a direction toward each other and the ratchet wheel and into engagement with fixed stop pins 37 fixed in the pawl carrier. When the rocker is moved upward through the influence of the magnet 26 a pallet 38 extending from the pawl 33 in a direction toward the ratchet wheel will engage with a tooth of said wheel and move the wheel one tooth space, such movement of the ratchet wheel being transmitted through the train of gearing 32 to the dial arbor. The pawl pallet 38 is maintained in engagement with the ratchet wheel through the influence of the spring 36. As the rocker 25 is moved downward through the influence of the magnet 27 by the arrangement of the extended pallet on pawl 33, the latter will clear the teeth of the ratchet wheel and the end of pawl 34 will engage a tooth of the ratchet wheel rotating the same and thereby the dial arbor, the pawl being maintained in position to engage a ratchet tooth by the spring 36. The movement of the rocker is limited and controlled by a pair of stops 25' adjustably carried, one above and the other below the rocker, by a bracket fixed to the frame F. To compensate for any adjustment in the movement of the rocker the magnets 26, 27 are adjustable. For this purpose the magnet support is suspended from the pivot support 28 of the rocker by a yoke shaped member 39 adapted to be variably adjusted relative to the throw of the rocker and pawls 33, 34 carried thereby between a pair of adjustable stops 40, in the form of set screws threaded in lugs extending laterally from brackets fixed to the frame F.

The dial D is in the form of a disk having graduations representative of weight and time to graphically record and indicate the quantities of material handled during successive periods of time of the same duration and to indicate the total weight handled during such successive periods of time. For this purpose the dial is arranged with a series of concentric and equidistantly spaced circles 41, thereon to provide the disk with a series of concentric graduations, to represent time and each graduation being indicative of a period of time of one hour. The dial in the present instance is arranged with twelve of such graduations being representative of twelve hours of time. It will be obvious that there may be a less or greater number of such graduations. The circular graduations are divided into equidistant and circumferentially disposed spaces by means of radial lines 42, these lines being in an arc of a circle whose center is at some point outside of the dial, and the lines arranged to commence at or intersect the axis of the dial and its arbor. The circumferentially disposed spaces formed by the radial lines are representative of weight, in the present instance each graduation or space being indicative of ten pounds, although it will be obvious that such space may be indicative of a less or greater number of pounds or represent units of weight in tons. The concentric circular graduations 41 are arranged with indices reading successively outward and indicative of time, in the present instance from 7 a. m. to 12 m. and from 1 p. m. to 7 p. m., representative of twelve hours of time. The dial may be provided with one or more series of such indices, there being four series in the present instance illustrated. The circumferentially disposed graduations are arranged with indices from zero to one thousand, representative of weight, each space being representative of ten pounds, and the indices being in multiples of fifty and arranged about the peripheral portion of the dial, said indices preferably commencing and terminating at one of the radial lines which has a series of the time indices arranged relative thereof. A central portion of the dial is preferably left blank to inscribe thereon the total weight of the material handled during the twelve or less number of hours of time.

A graphic record is made upon the dial by a scriber inscribing a line on the dial parallel to the concentric division lines 41, and extending in the direction of travel of the dial, and after a predetermined period of time, in the present instance hourly periods, is moved or stepped laterally or radially a predetermined distance, in the present instance a distance equal to the width of one of the circular spaces, or from one circular division line to the next succeeding outer division line, the angle subtended by such successively inscribed circular lines being representative of the weight of the material handled every successive hour. This scriber may be any suitable tool adapted to inscribe a visible line or mark on the dial, such as a pencil, attached to a carrier comprising a pair of sections 42ª, 42ᵇ, the section 42ª being releasably connected to the section 42ᵇ and to have longitudinal adjustment relative thereto. The sections 42ª, 42ᵇ and the marker carried thereby have been herein termed the "scriber." The scriber is adjustably carried by one arm of a lever 43 pivotally supported in a frame 44 fixed to the frame F whereby the free end of the scriber carrying the marker extends in front of and in juxtaposed relation to the dial to be observed through the window 13 in the casing closure 12, the pivotal support of the scriber carrier 43 and the radial division lines 42 on the dial being so arranged and the marker carrying end of the scriber positioned so that it will be moved in a line transversely or laterally of the dial in parallel relation to said divisional lines 42. The scriber is preferably made of resilient material and arranged so that the tension thereof will press the marker against the dial with sufficient force to inscribe a mark on the dial but not sufficient to retard the movement of the dial. It will be obvious the scriber will inscribe a line on the dial during the rotative movement of the latter in parallel relation to the circular division lines 41. However, after the lapse of a predetermined period of time, in the present instance periods of one hour, the scriber is moved laterally or radially outward of the dial to mark the dial in parallel relation to the next adjacent outer circular division line, the number of circumferential spaces traversed by the scriber being representative of and indicating the quantity or weight of material handled during such successive periods of time.

This lateral movement is imparted to the scriber by means in the form of a cam 45 (Figure 7) actuated by time controlled means comprising a spring motor, which is in the nature of a clock movement (designated in a general way by S) carried by the frame 44. The cam is fixed to a shaft 46 rotatably mounted in the frame 44, with which cam a cam follower 47 carried by the other arm of the lever 43 for the scriber co-operates, said lever being normally urged in a direction with the cam follower in engagement with the cam and the scriber in a direction toward the axis of the dial arbor, by a spring 48. The cam edge of the cam is successively stepped outwardly to progressively increase the throw of the cam, as at 49, the cam in the present instance having twelve of such steps equal to the number of concentric graduations on the dial, and operative to move the scriber laterally of the dial twelve successive times or steps. The steps of the cam are arranged and the cam is intermittently rotated so that the lateral movements of the scriber from one circular division line to the next adjacent line is by a relatively quick movement. The cam is rotated from a wheel 50 which is given a complete rotation in each period of one hour, said gear being operatively connected by gearing 51 (Figure 6) with a wheel 52 having a single tooth, the ratio of the gearing being such that said wheel will be given one complete revolution upon each revolution of the gear 50. The tooth of this wheel is adapted to co-operate with a gear 53 fixed to the cam carrying shaft 46 whereby said gear is moved one tooth space upon each revolution of the gear 52. The gear 53 has twelve teeth whereby a complete revolution is imparted to the cam every twelve hours.

As stated the present invention is adapted for use in connection with material handling means, such as automatic weighing mechanism, to determine the weight of a load while in motion, for instance as that disclosed in Patent No. 954,870 for integrating device granted to me April 12th, 1910, and to graphically record the weight or quantity of material handled by such a mechanism in a predetermined period of time, or successive periods of time of the same duration. In Figure 11 there is shown such a mechanism only so much of the mechanism being shown as is deemed essential to an understanding of the invention, and for more detailed information relative to said mechanism reference may be had to my patent hereinbefore referred to. This material handling means comprises a material handling way in the form of a traveling conveyer belt 55, means being provided to suspend a portion of such conveyer from a weighing beam 56 the load on the conveyer being resisted by a suitable dash pot operatively connected to the end of the beam. An integrating or planimeter wheel 57 is carried in a frame 58 to rotate in a horizontal plane with the beam in horizontal position or equilibrium. The frame 58 is pivotally supported to have movement on a horizontal axis and is connected to the weighing beam to participate in the deflection thereof and thereby change the plan of traveling of the integrating wheel relative to the horizontal. The integrating wheel is rotated by the opposite parallel stretches of a belt 59 engaging therewith, said belt being driven by and in synchronism with the speed of travel of the conveyer belt. The direction of travel of said belt 59 is fixed and is in a direction parallel to the axis of the integrating wheel with no load on the conveyer; in which position no movement will be imparted to the integrating wheel. It will be obvious that the velocity or speed of rotation of the integrating wheel will be varied in accordance with the angular relation thereof to the direction of travel of the belt, and that said relation of the integrating wheel relative to the belt is varied by and in accordance with the load on the conveyer. The result of integration is ascertained by the rotation of the wheel, each revolution of the wheel being indicative of a quantity of material transported by the conveyer.

The actuation of the recording mechanism to record the quantity of material handled by the conveyer is controlled from the integrating device by controlling the electromagnetic means for actuating the dial. For this purpose there is connected to the integrating device, or a mechanism to record the integrated result operatively connected to the integrating device, diagrammatically illustrated at 60 in Figure 5, having a contact terminal 61 rotatable with the prime mover thereof connected in circuit with a source of electricity, shown in a conventional manner as a battery B, by a conductor 62, which battery is connected in circuit with one terminal of the winding of the solenoid 26 by a conductor 63 and with a terminal of the winding of solenoid 27 by a branch conductor 64. The other terminals of the windings of the coils of the solenoids 26, 27 are connected by conductors 65, 66 with circuit opening and closing means in the form of contact makers 67, 68 respectively, to co-operate with the contact terminal 61 to connect the solenoids in circuit with the source of electricity and render the same active.

Assuming the contact 61 to be rotated in the direction of the arrow and in the position shown in contact with the contact maker 67 thereby connecting the magnet 26 in the circuit and energizing the same and operating to attract the magnetizable member 29 of the rocker thereto moving the rocker in one direction causing the pallet or pawl 33 to engage a tooth of the ratchet wheel 30 imparting to the ratchet an increment of movement and through the ratchet wheel and connected gearing to the dial. As the contact 61 moves out of contact with the contact maker 67 it will then be brought into engagement with the contact 68 closing the circuit for magnet 27 causing said magnet to be energized and attracting the magnetizable member thereto moving the rocker in reverse direction and causing the pawl 34 to engage a tooth of the ratchet wheel 30 imparting a further increment of movement thereto and to the dial. The dial is moved relative to the scriber and the latter thereby inscribing a line on the dial in the direction of travel of the dial and in parallel relation to the circular lines 41. After a lapse of one hour the cam 45 is moved one step and thereby the scriber is moved laterally from one circular division line to the next adjacent outer division line. In some instances it may not be desirable or necessary to make a graphic record of the weight or quantity of material handled by the way during successive periods of time, but it may be desirable to have a record of the total weight or quantity of material handled. For this purpose a counter is provided, indicated at 70 to be actuated by the actuating means for the dial. This counter is mounted upon the frame F to be exposed through the window 19 in the casing closure. The counter is operatively connected to the ratchet wheel 30 by a gear 71 meshing with the gear 31 rotatable with the ratchet wheel, a bevel pinion 72 rotatable with the gear 71 meshing with a bevel pinion 73 on a shaft 74 having a second bevel pinion 75 thereon meshing with a bevel pinion 76 rotatable with the primary or unit digit wheel of the counter.

In Figure 8 there is graphically represented a chart record of the quantity of material handled for substantially nine successive periods of time, each period of time being one hour. The mechanism was set in operation at approximately 9 a. m. or shortly thereafter with the scriber in position coinciding with the circular division line indicated by "9" and the radial division line representative of 290 pounds. During the period of time from 9 o'clock to 10 o'clock the quantity of material handled is represented by the portion 77 of the curved indicating line extending from the radial lines indicative of 290 pounds to the radial division line indicative of 470 pounds, the quantity or weight of material handled being the difference between 290 and 470 pounds or 180 pounds. At this time the scriber is moved or stepped laterally, indicated by the portion 78 of the graphic recording line. During the next hour or from 10 to 11 o'clock the quantity of material handled is indicated by the portion 79 of the graphic recording line reading from the radial division line indicative of 470 pounds to the radial line indicative of 590 pounds and the weight of material handled being the difference between 470 and 590 pounds or 120 pounds. After each successive period of time of one hour the scriber is moved laterally a distance between adjacent circular division lines, and the weight of material handled is indicated by the graphic line between two portions of said line indicative of the lateral movement of the scriber. While the weight of the material has been described as being in pounds it will be obvious that the same may be indicated in any other unit of measurement, such, for instance, as in tons.

Having thus described my invention I claim:

1. In chart recording means, a rotatable dial; means to intermittently rotate said dial; a scriber engaging with the dial to inscribe a line thereon to extend in the direction of travel of the dial during the rotation of the dial; a rotatable cam arranged with a successively stepped and progressively increased throw; a clock work operative to rotate said cam at a constant speed independent of the dial rotating means; a lever to one arm of which lever the scriber is connected and the other arm arranged with a cam follower to co-operate with the cam, and said lever normally urged in a direction to position the cam follower in engagement with the cam and the scriber toward the axis of the dial, and a clock movement upon the arbor of the hour hand on which the cam is mounted and adapted to actuate the cam to move the lever a predetermined distance at successive periods of time and the scriber laterally of the dial for the purpose specified.

2. In means to graphically record the quantity of material handled by material handling means in a predetermined period of time, a source of electricity having a make and break contact in circuit therewith controlled by the material handling means; a dial; a rotatable support for the dial; means to rotate said dial support; electromagnetic means in circuit with the source of electricity and adapted to be connected into and cut out of circuit therewith by the make and break contact to control the energization of said electromagnetic means and intermittently actuate the rotating means; and means to co-operate with the dial to inscribe a line thereon to extend in the direction of travel of the dial and laterally for a predetermined distance at successive periods of time for the purpose specified.

3. In means to graphically record the quantity of material handled by material handling means in successive periods of time, a source of electricity having electromagnetic means and circuit closing and opening means connected in circuit therewith, said circuit closing and opening means being operative at variable successive periods of time; a rotatable dial; means operative from the electromagnetic means to rotate said dial; and means to inscribe a line on the dial to extend in the direction of travel of the dial and laterally thereof for a predetermined distance at successive predetermined periods of time.

4. In means to graphically record the quantity of material handled by material handling means in successive periods of time and an integrating device controlled by said material handling means, means controlled by the integrating device to graphically record the result of the integration comprising a source of electricity having electromagnetic means and circuit closing and opening means controlled by the integrating device in circuit therewith; a rotatable dial; means actuated by the electromagnetic means and controlled by the movement of the integrating device to rotate said dial variable distances in successive predetermined periods of time; and a scriber to graphically represent on the dial the variations in the rotation of the dial during the successive periods of time.

5. In means to graphically record the quantity of material handled by material handling means and an integrating device controlled by said material handling means to determine the quantity of material handled by the material handling means, a rotatable dial; means to rotate said dial controlled by the integrating device; and means to inscribe a line on the dial to extend in the direction of travel of the dial indicative of the quantity of material handled, and moved successively laterally of the dial a predetermined distance indicative of periods of time.

6. In means to graphically record the quantity of material handled by a material handling way in successive periods of time and an integrating device controlled by said material handling means, a rotatably supported dial, electrically operated means to rotate said dial controlled by the integrating device, a scriber to engage with said dial, and time controlled means to move the scriber relative to the dial whereby said scriber is adapted to graphically record on the dial variations in the quantity of material handled in successive predetermined periods of time, and the total quantity of material handled during the successive periods of time.

Signed at Passaic, in the county of Passaic and State of New Jersey.

HERBERT L. MERRICK.